(12) United States Patent
Chen

(10) Patent No.: US 10,073,205 B1
(45) Date of Patent: Sep. 11, 2018

(54) OPTICAL MODULE OF VEHICLE LIGHT AND LIGHT GUIDE

(71) Applicant: Maxzone Vehicle Lighting Corp., Fontana, CA (US)

(72) Inventor: Wei-Ming Chen, Tainan (TW)

(73) Assignee: MAXZONE VEHICLE LIGHTING CORP., Fontana, CA (US)

( * ) Notice: Subject to any disclaimer, the term of this patent is extended or adjusted under 35 U.S.C. 154(b) by 0 days.

(21) Appl. No.: 15/648,525

(22) Filed: Jul. 13, 2017

(30) Foreign Application Priority Data

May 5, 2017 (TW) .............................. 106206399 U

(51) Int. Cl.
*F21V 9/00* (2018.01)
*F21V 8/00* (2006.01)
*F21V 7/04* (2006.01)

(52) U.S. Cl.
CPC .............. *G02B 6/0001* (2013.01); *F21V 7/04* (2013.01)

(58) Field of Classification Search
CPC ................................ G02B 6/0001; F21V 7/04
See application file for complete search history.

(56) References Cited

U.S. PATENT DOCUMENTS

| | | | | |
|---|---|---|---|---|
| 2006/0056789 A1* | 3/2006 | Saito | .................... | G02B 6/0018 385/140 |
| 2009/0201696 A1* | 8/2009 | Kamikatano | .......... | G02B 6/001 362/551 |
| 2010/0202153 A1 | 8/2010 | Schwab | | |
| 2013/0201709 A1 | 8/2013 | Natsume | | |
| 2014/0029292 A1* | 1/2014 | Mizushiro | ............ | G02B 6/0038 362/565 |
| 2014/0293630 A1 | 10/2014 | Domini | | |

FOREIGN PATENT DOCUMENTS

| EP | 1970616 A1 | 9/2008 |
|---|---|---|
| EP | 2955432 A2 | 12/2015 |

* cited by examiner

*Primary Examiner* — Ali Alavi
(74) *Attorney, Agent, or Firm* — Li & Cai Intellectual Property (USA) Office

(57) ABSTRACT

An optical module of a vehicle light includes a light guide and a light source arranged adjacent to an end of the light guide. The light guide includes a main portion and several light reflecting structures connected to each other and arranged on the main portion in one row. Each light reflecting structure defines a datum plane arranged adjacent to the main portion, and includes a light transmitting surface, a light reflecting surface, and a connecting surface connected to the light transmitting surface and the light reflecting surface. In each light reflecting structure, an angle between the light transmitting surface and the datum plane is larger than that between the light reflecting surface and the datum plane. The thicknesses of the light reflecting structures, each is defined by a distance between the connecting surface and the datum plane, are gradually increased in a direction away from the light source.

10 Claims, 8 Drawing Sheets

OPTICAL MODULE OF VEHICLE LIGHT AND LIGHT GUIDE

BACKGROUND OF THE INVENTION

1. Field of the Invention

The present disclosure relates to an optical module; in particular, to an optical module of a vehicle light and a light guide.

2. Description of Related Art

A conventional light guide applied to an optical module of a vehicle light includes a plurality of light reflecting structures used for reflecting light, which travels in the conventional light guide. Specifically, a traveling angle of a first part of the light traveling in a front portion of the conventional light guide is different from that of a second part of the light traveling in a rear portion of the conventional light guide. However, the light reflecting structures of the conventional light guide almost have the same structure, which is unable to effectively utilize the first and second parts of the light by reflecting and transmitting, so that the conventional light guide does not have a better light reflecting performance. Thus, the conventional light guide applied to the optical module of the vehicle light needs to be improved.

SUMMARY OF THE INVENTION

The present disclosure provides an optical module of a vehicle light and a light guide to solve the drawbacks associated with conventional light guides applied to an optical module of a vehicle light.

The present disclosure provides an optical module of a vehicle light including a light guide and a light source. The light guide includes a main portion and a light reflecting portion. The main portion has an elongated shape defining a longitudinal direction. The main portion has a light entering surface and an end surface respectively arranged on two opposite sides thereof in the longitudinal direction. The light reflecting portion includes a plurality of light reflecting structures arranged on the main portion. The light reflecting structures are arranged in one row parallel to the longitudinal direction, and any two adjacent light reflecting structures are connected to each other. Each of the light reflecting structures defines a datum plane arranged adjacent to the main portion, and includes a light transmitting surface, a light reflecting surface, and a connecting surface. The light transmitting surface is connected to a portion of the datum plane arranged adjacent to the light entering surface. The light transmitting surface and the datum plane have a first angle. The light reflecting surface is connected to a portion of the datum plane arranged distant from the light entering surface. The light reflecting surface and the datum plane have a second angle smaller than the first angle. The connecting surface is connected to the light transmitting surface and the light reflecting surface, and is arranged distant from the datum plane. A distance between the connecting surface and the datum plane is defined as a thickness. The thicknesses of the light reflecting structures are gradually increased in a direction from the light entering surface to the end surface. The light source is arranged adjacent to the light entering surface of the main portion. The light source is configured to emit light to pass through the light entering surface for traveling in the light guide, and the light reflecting surface of each of the light reflecting structures is configured to totally reflect a first part of the light, that travels in the light guide, to an external space through the main portion.

The present disclosure also provides a light guide and a light reflecting portion. The main portion has an elongated shape defining a longitudinal direction. The main portion has a light entering surface and an end surface respectively arranged on two opposite sides thereof in the longitudinal direction. The light reflecting portion includes a plurality of light reflecting structures arranged on the main portion. The light reflecting structures are arranged in one row parallel to the longitudinal direction, and any two adjacent light reflecting structures are connected to each other. Each of the light reflecting structures defines a datum plane arranged adjacent to the main portion, and includes a light transmitting surface, a light reflecting surface, and a connecting surface. The light transmitting surface is connected to a portion of the datum plane arranged adjacent to the light entering surface. The light transmitting surface and the datum plane have a first angle. The light reflecting surface is connected to a portion of the datum plane arranged distant from the light entering surface. The light reflecting surface and the datum plane have a second angle smaller than the first angle. The connecting surface is connected to the light transmitting surface and the light reflecting surface, and is arranged distant from the datum plane. A distance between the connecting surface and the datum plane is defined as a thickness. The thicknesses of the light reflecting structures are gradually increased in a direction from the light entering surface to the end surface.

In summary, the optical module of the vehicle light and the light guide in the present disclosure each have a plurality of different light reflecting structures, and each of the different light reflecting structures is formed according to a distance relative to the light entering surface, so that the light reflecting structures can be configured to effectively reflect light traveling in different portions of the light guide. Thus, the light guide can be provided with a preferred light reflecting performance.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

References are hereunder made to the detailed descriptions and appended drawings in connection with the present disclosure. However, the appended drawings are merely provided for exemplary purposes, and should not be construed as restricting the scope of the present disclosure.

Figure 1:
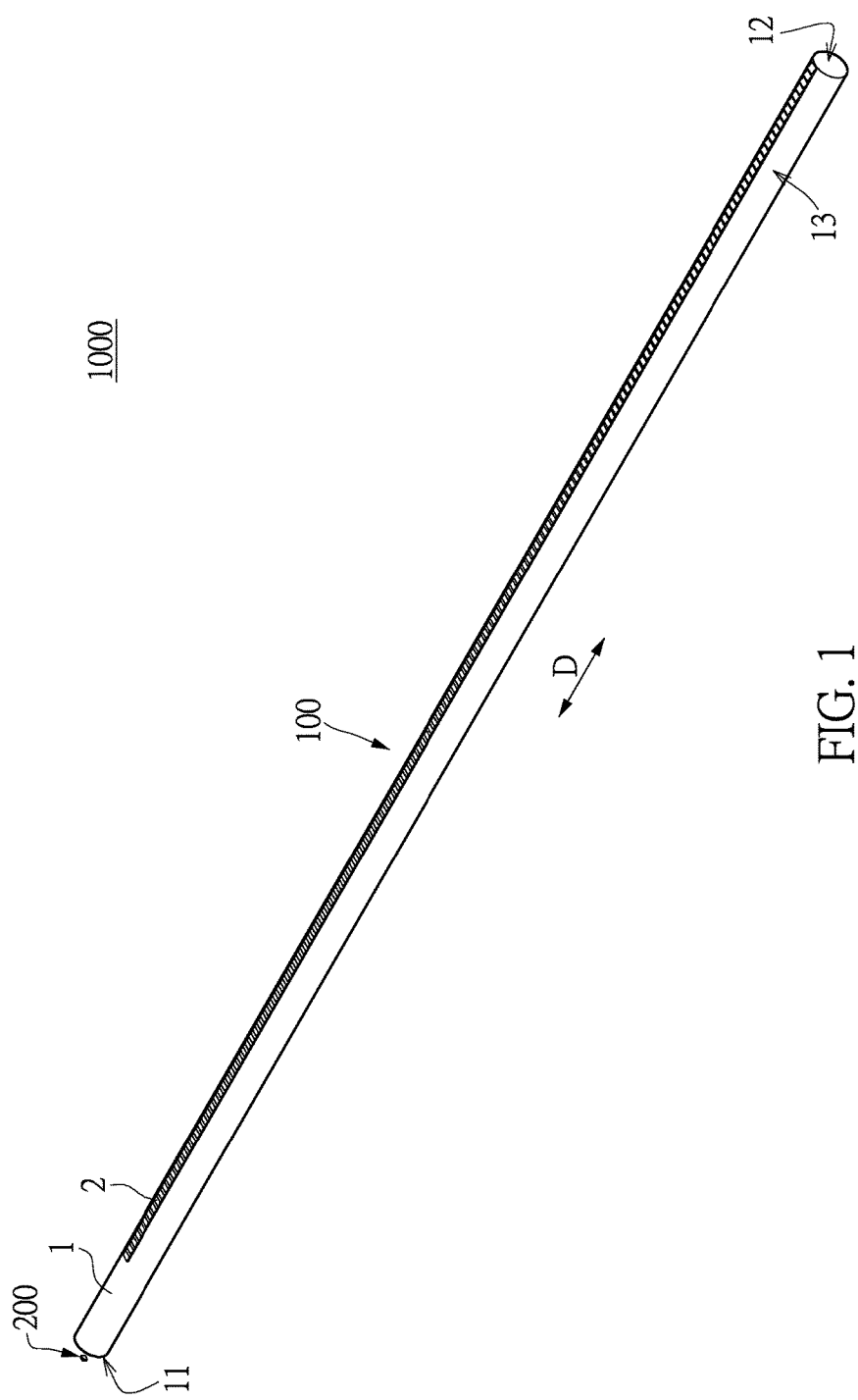
FIG. 1 is a perspective view showing an optical module of a vehicle light according to the present disclosure.
Figure 2:
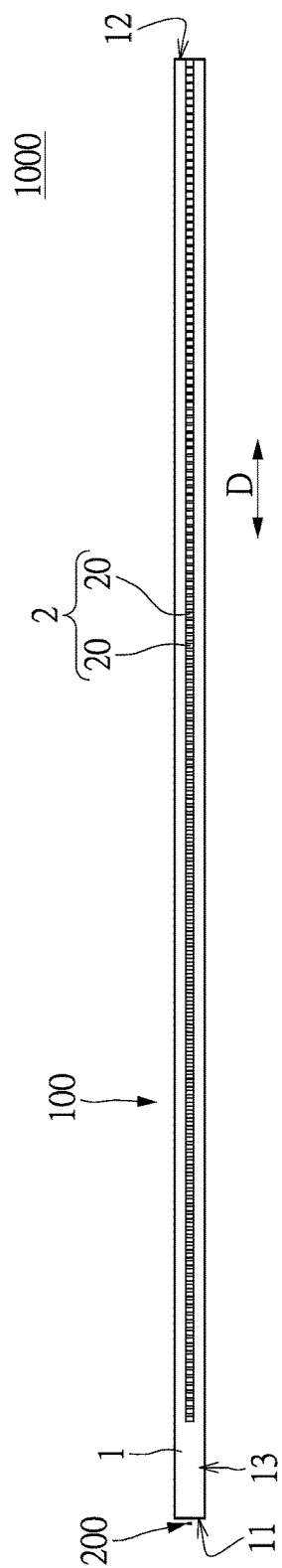
FIG. 2 is a top view of FIG. 1.
Figure 3:
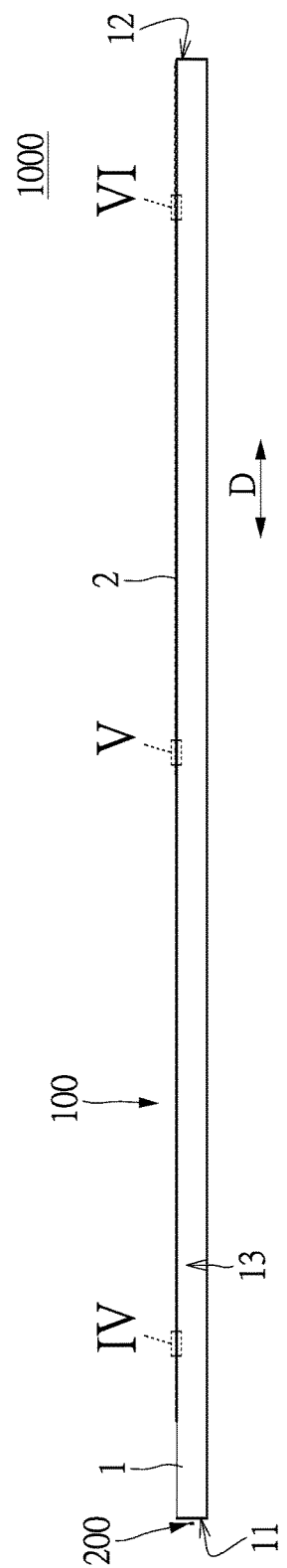
FIG. 3 is a side view of FIG. 1.

Reference is made to FIGS. 1 to 6B, which illustrate an embodiment of the present disclosure. As shown in FIGS. 1 to 3, the present embodiment discloses an optical module of a vehicle light 1000 including a light guide 100 and a light source 200. The light guide 100 in the present embodiment has an elongated shape, and the light source 200 is arranged adjacent to an end of the light guide 100, so that the light guide 100 can be used to guide light, that is emitted from the light source 200, to travel therein and to pass through a desired lighting portion thereof. The light guide 100 in the present embodiment is a straight structure, but the present disclosure is not limited thereto. For example, in other embodiments of the present disclosure, the light guide 100 can be an arc-shaped structure.

In addition, the light guide 100 in the present embodiment is applied to the optical module of the vehicle light 1000, but the light guide 100 can be applied to another optical module in other embodiments (not shown). That is to say, the applied field of the light guide 100 of the present disclosure is not limited to the present embodiment.

As shown in FIGS. 1 to 3, the light guide 100 is integrally formed as one piece and includes a main portion 1 and a light reflecting portion 2. Moreover, the material of the light guide 100 can be PMMA, PC, or other plastic materials.

The main portion 1 has an elongated shape defining a longitudinal direction D. The main portion 1 has a light entering surface 11 and an end surface 12, which are respectively arranged on two opposite sides thereof in the longitudinal direction D (i.e., the left side and the right side of the main portion 1 as shown in FIG. 3). The main portion 1 has a surrounding side surface 13 arranged between the light entering surface 11 and the end surface 12. The main portion 1 is substantially a cylindrical structure, but the present disclosure is not limited thereto.

The light reflecting portion 2 includes a plurality of light reflecting structures 20 arranged on the surrounding side surface 13 of the main portion 1. The light reflecting structures 20 are arranged in one row parallel to the longitudinal direction D, and any two adjacent light reflecting structures 20 are connected to each other. It should be noted that in order to clearly describe the light reflecting structures 20, the following description discloses the common features of the light reflecting structures 20, and then discloses the different features of the light reflecting structures 20.

Figure 4A:
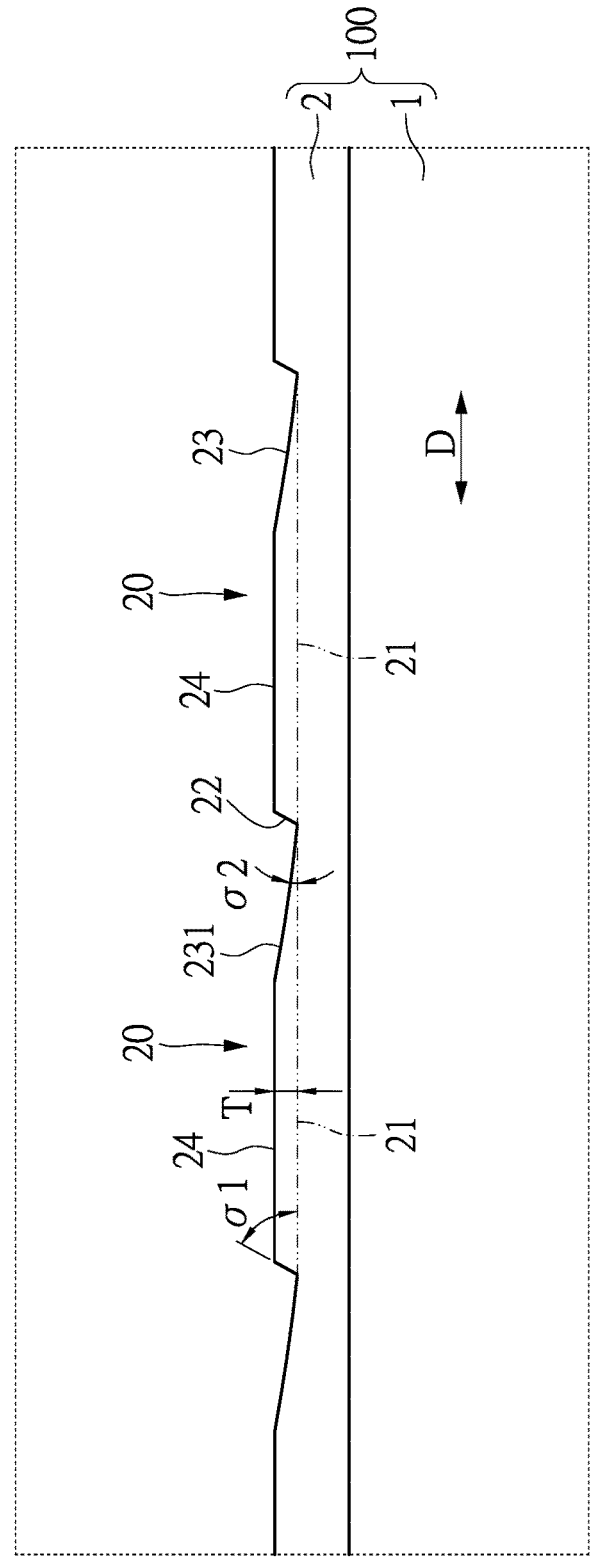
FIG. 4A is an enlarged view showing a portion IV of FIG. 3.
Figure 4B:
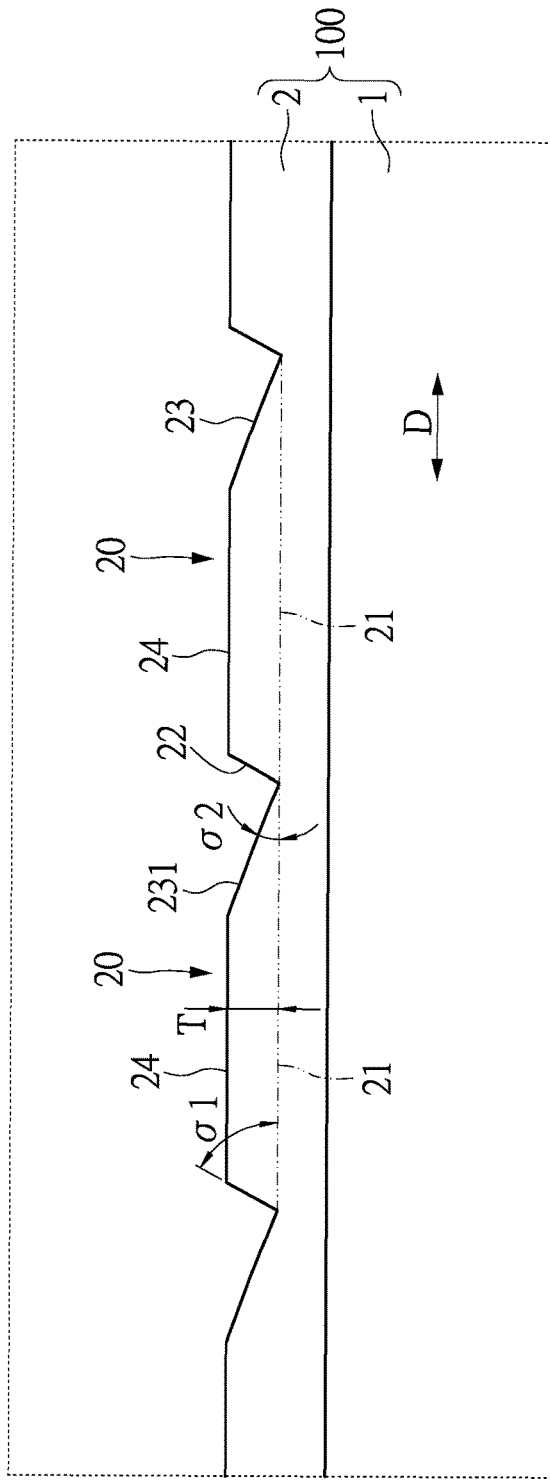
FIG. 4B is an enlarged view showing the portion IV of FIG. 3 in another configuration.
Figure 5A:
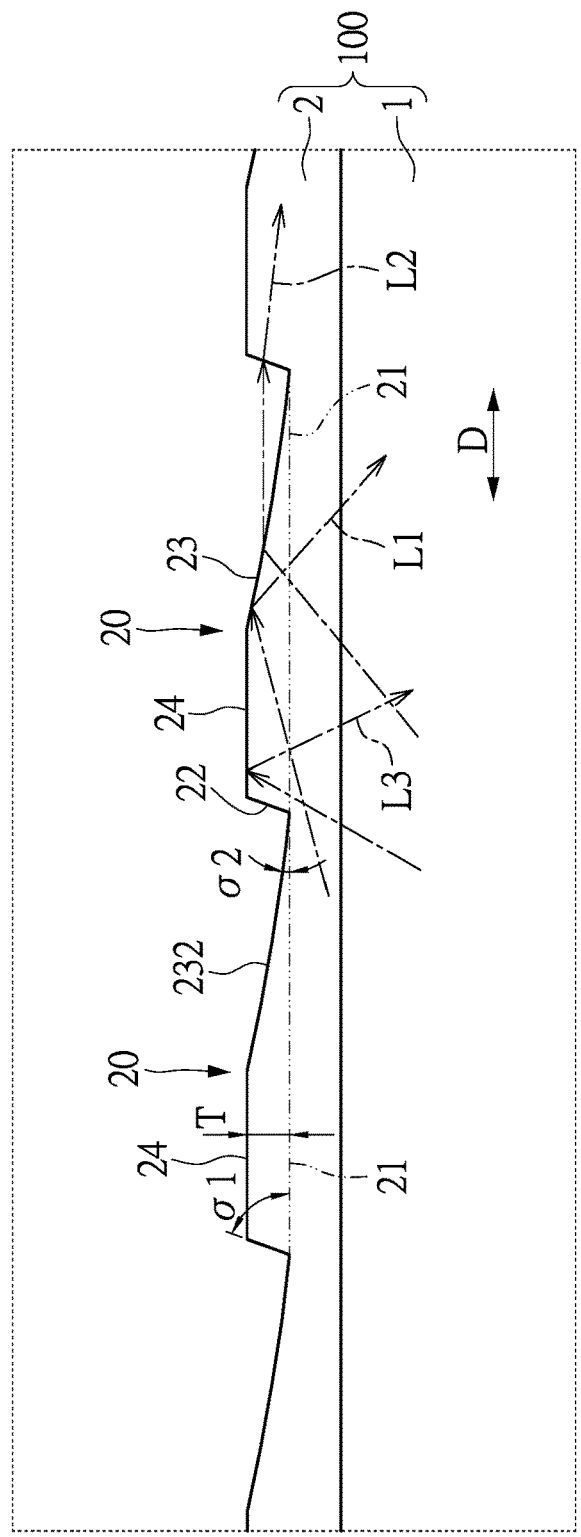
FIG. 5A is an enlarged view showing a portion V of FIG. 3.
Figure 5B:
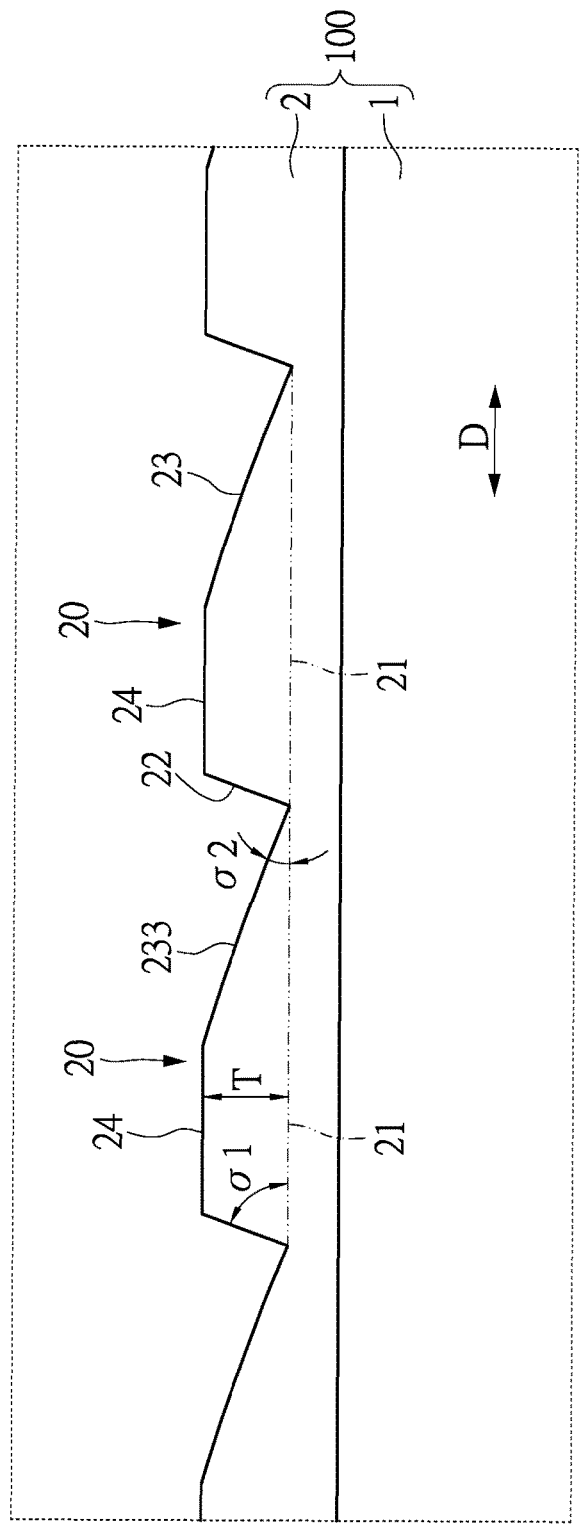
FIG. 5B is an enlarged view showing the portion V of FIG. 3 in another configuration.
Figure 6A:
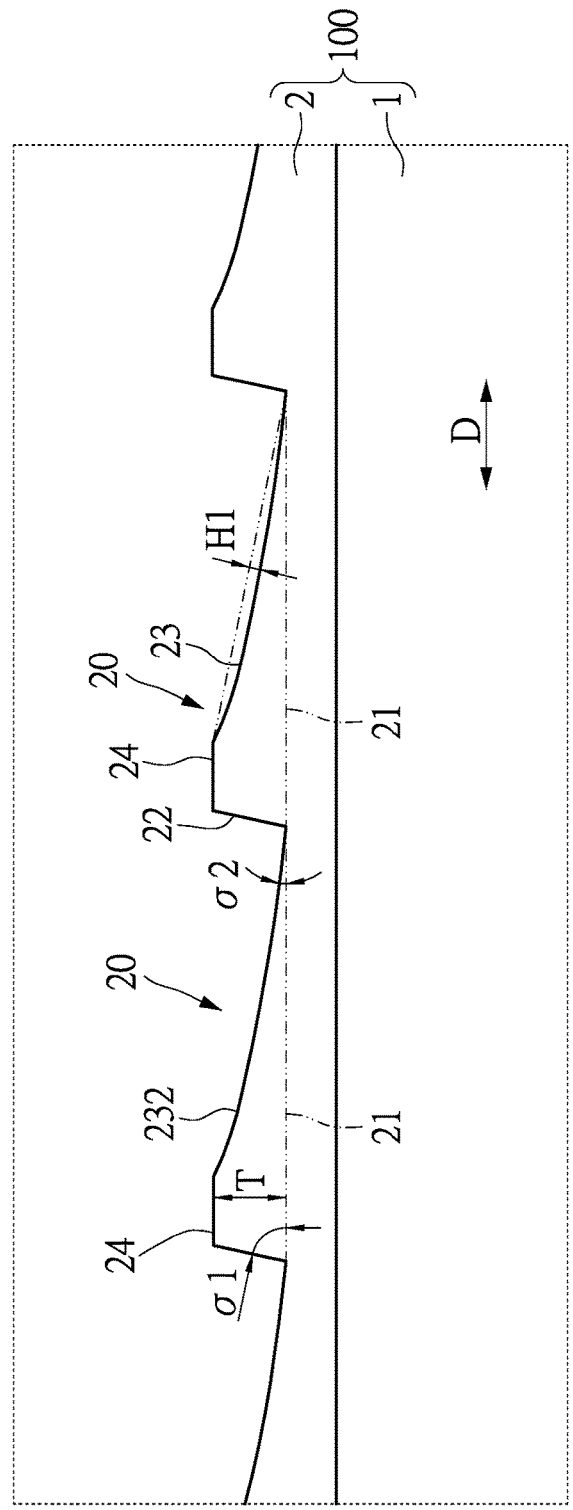
FIG. 6A is an enlarged view showing a portion VI of FIG. 3.

Reference is made to FIGS. 4A, 5A, and 6A, which have the same magnification and respectively illustrate a front segment, a middle segment, and a rear segment of the light guide 100. Or, reference is made to FIGS. 4B, 5B, and 6B, which have the same magnification and respectively illustrate a front segment, a middle segment, and a rear segment of the light guide 100 in another configuration. However, the present disclosure is not limited to the figures.

For each of the light reflecting structures 20, the light reflecting structure 20 defines a datum plane 21 arranged adjacent to the main portion 1, and includes a light transmitting surface 22, a light reflecting surface 23, and a connecting surface 24. The light transmitting surface 22 is connected to a portion of the datum plane 21 (i.e., the left portion of the datum plane 21 as shown in FIG. 4A) arranged adjacent to the light entering surface 11. The light transmitting surface 22 and the datum plane 21 have a first angle $\sigma 1$, which is preferably within a range of 50~85 degrees.

Moreover, the light reflecting surface 23 is connected to a portion of the datum plane 21 (i.e., the right portion of the datum plane 21 as shown in FIG. 4A) arranged distant from the light entering surface 11. The light reflecting surface 23 and the datum plane 21 have a second angle $\sigma 2$ smaller than first angle $\sigma 1$, and the second angle $\sigma 2$ is preferably within a range of 5~45 degrees. The connecting surface 24 is connected to the light transmitting surface 22 and the light reflecting surface 23, and is arranged distant from the datum plane 21. A distance between the connecting surface 24 and the datum plane 21 is defined as a thickness T.

For all of the light reflecting structures 20 formed on the main portion 1, the datum planes 21 of the light reflecting structures 20 have the same length in the longitudinal direction D. In any two adjacent light reflecting structures 20 (i.e., the middle two light reflecting structures 20 as shown in FIG. 4A), the first angle $\sigma 1$ of one of the two adjacent light reflecting structures 20 (i.e., the first angle $\sigma 1$ of the left light reflecting structure 20 as shown in FIG. 4A) arranged adjacent to the light entering surface 11 is smaller than or identical to that of the other light reflecting structure 20 (i.e., the first angle $\sigma 1$ of the right light reflecting structure 20 as shown in FIG. 4A). Moreover, in any two adjacent light reflecting structures 20, the second angle $\sigma 2$ of one of the two adjacent light reflecting structures 20 (i.e., the second angle $\sigma 2$ of the left light reflecting structure 20 as shown in FIG. 4A) arranged adjacent to the light entering surface 11 is smaller than or identical to that of the other light reflecting structure 20 (i.e., the second angle $\sigma 2$ of the right light reflecting structure 20 as shown in FIG. 4A).

In other words, the first angles $\sigma 1$ of the light reflecting portion 2 are gradually increased in a direction (i.e., a direction from the left side to the right side as shown in FIG. 4A) from the light entering surface 11 to the end surface 12 (i.e., the first angles $\sigma 1$ as shown in FIGS. 4A, 5A, and 6A are gradually increased from FIG. 4A to FIG. 6A). The second angles $\sigma 2$ of the light reflecting portion 2 are gradually increased in the direction from the light entering surface 11 to the end surface 12 (i.e., the second angles $\sigma 2$ as shown in FIGS. 4A, 5A, and 6A are gradually increased from FIG. 4A to FIG. 6A).

Moreover, the thicknesses T of the light reflecting structures 20 are gradually increased in the direction from the light entering surface 11 to the end surface 12 (i.e., the thicknesses T as shown in FIGS. 4A, 5A, and 6A are gradually increased from FIG. 4A to FIG. 6A). The lengths of the connecting surfaces 24 of the light reflecting structures 20 in the longitudinal direction D are gradually decreased in the direction from the light entering surface 11 to the end surface 12 (i.e., the lengths of the connecting surfaces 24 as shown in FIGS. 4A, 5A, and 6A are gradually increased from FIG. 4A to FIG. 6A).

Specifically, the connecting surfaces 24 in the present embodiment are flat surfaces parallel to each other, and each of the connecting surfaces 24 is substantially parallel to a tangent plane of the main portion 1. The light transmitting surfaces 22 in the present embodiment are flat surfaces, which are respectively and slantingly connected to the connecting surfaces 24. At least one of the light reflecting surfaces 23 can be a flat surface 231, a concave surface 232, or a convex surface 233. In other words, the light reflecting surfaces 23 include at least one of the flat surfaces 231 (as shown in FIG. 4A or FIG. 4B), the concave surfaces 232 (as shown in FIG. 5A or FIG. 6A), and the convex surfaces 233 (as shown in FIG. 5B or FIG. 6B).

Figure 6B:
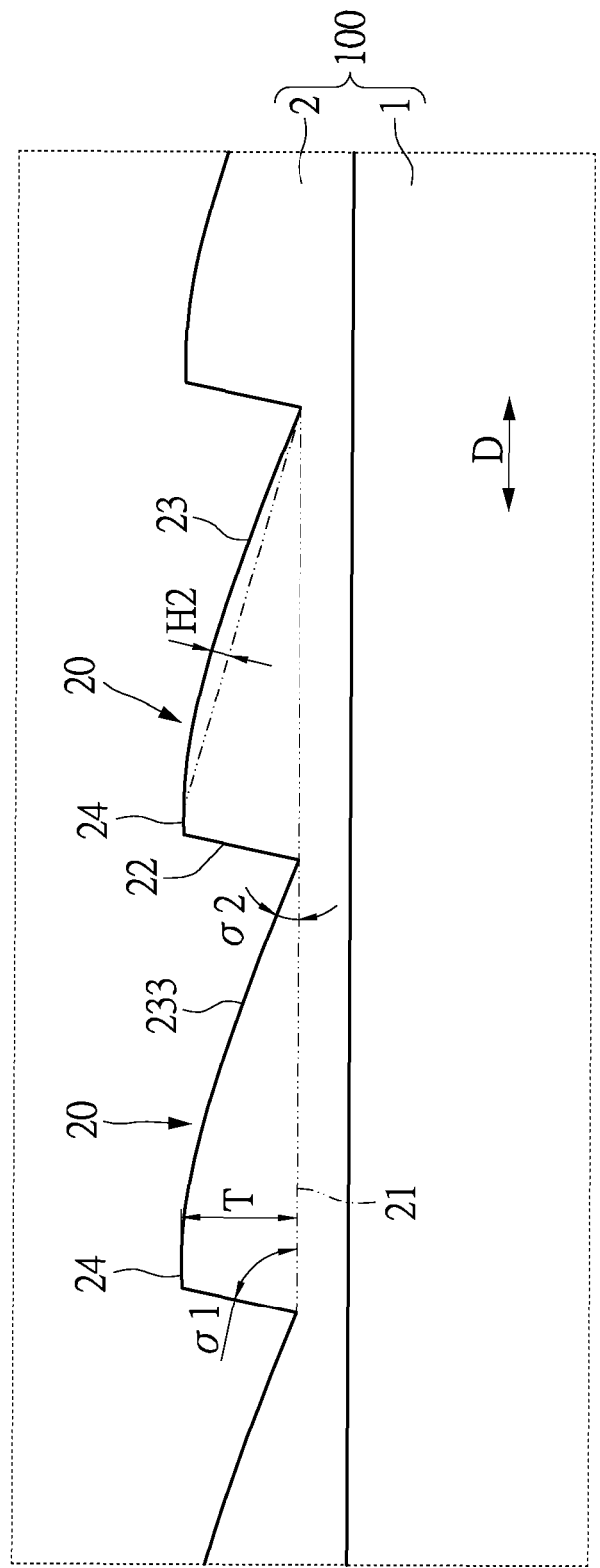
FIG. 6B is an enlarged view showing the portion VI of FIG. 3 in another configuration.

Moreover, in the present embodiment, a concaving depth H1 of each of the concave surfaces 232 (compared to the corresponding flat surface 231) is preferably less than or equal to 0.15 mm (as shown in FIG. 6A), and a protruding thickness H2 of each of the convex surfaces 233 (compared to the corresponding flat surface 231) is preferably less than or equal to 0.15 mm (as shown in FIG. 6B), but the concave surfaces 232 and the convex surfaces 233 are not limited to the present embodiment.

As shown in FIGS. 3 and 5A, the light source 200 in the present embodiment is an LED chip, but the present disclosure is not limited thereto. For example, in other embodiments of the present disclosure, the light source 200 can be an OLED chip or other lighting components. The light source 200 is arranged adjacent to and faces the light entering surface 11 of the main portion 1, so that the light source 200 is configured to emit light to pass through the light entering surface 11 for traveling in the light guide 100.

The light reflecting surface 23 of each of the light reflecting structures 20 is configured to totally reflect a first part of the light L1, that travels in the light guide 100, to an external space through the main portion 1 (e.g., the first part of the light L1 leaves from the main portion 1 to the external space by passing through a portion of the surrounding side surface 13 arranged away from the light reflecting portion 2). Specifically, each of the light reflecting surfaces 23 can be formed as the flat surface 231, the concave surface 232, or the convex surface 233 according to practical needs.

Moreover, as shown in FIG. 5A, the light reflecting surface 23 of each of the light reflecting structures 20 is configured to guide a second part of the light L2, that travels in the light guide 100 and is not totally reflected by the light reflecting surface 23, to the adjacent light transmitting surface 22 through an external space, so that the second part of the light L2 can still travel in the light guide 100 to reduce a light loss. Specifically, in each of the light reflecting structures 20, the light transmitting surface 22 can be configured to guide the second part of the light L2, that comes from an external space, to the light reflecting surface 23, so that the second part of the light L2 can be totally reflected by the light reflecting surface 23 for being transmitted to an external space through the main portion 1.

In addition, the connecting surface 24 of each of the light reflecting structures 20 is configured to totally reflect a third part of the light L3, that travels in the light guide 100, to an external space through the main portion 1.

The Possible Effects of the Present Disclosure

In summary, the optical module of vehicle light 1000 and the light guide 100 in the present disclosure each have a plurality of different light reflecting structures 20, and each of the light reflecting structures 20 is formed according to a distance relative to the light entering surface 11, so that the light reflecting structures 20 can be configured to effectively reflect light traveling in different portions of the light guide 100. Thus, the light guide 100 can be provided with a preferred light reflecting performance.

Moreover, the light reflecting surface 23 of each of the light reflecting structures 20 can be formed as the flat surface 231, the concave surface 232 having the concaving depth H1 less than or equal to 0.15 mm, or the convex surface 233 having the protruding thickness H2 less than or equal to 0.15 mm, so that the light guide 100 can be provided with different lighting modes for satisfying different practical needs.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. An optical module of a vehicle light, comprising:
   a light guide including:
      a main portion having an elongated shape defining a longitudinal direction, wherein the main portion has a light entering surface and an end surface respectively arranged on two opposite sides thereof in the longitudinal direction; and
      a light reflecting portion including a plurality of light reflecting structures arranged on the main portion, wherein the light reflecting structures are arranged in one row parallel to the longitudinal direction, and any two adjacent light reflecting structures are connected to each other, wherein each of the light reflecting structures defines a datum plane arranged adjacent to the main portion, and includes:
         a light transmitting surface connected to a portion of the datum plane arranged adjacent to the light entering surface, wherein the light transmitting surface and the datum plane have a first angle;
         a light reflecting surface connected to a portion of the datum plane arranged distant from the light entering surface, wherein the light reflecting surface and the datum plane have a second angle smaller than the first angle; and
         a connecting surface connected to the light transmitting surface and the light reflecting surface and arranged distant from the datum plane, wherein a distance between the connecting surface and the datum plane is defined as a thickness,
      wherein the thicknesses of the light reflecting structures are gradually increased in a direction from the light entering surface to the end surface; and
   a light source arranged adjacent to the light entering surface of the main portion, wherein the light source is configured to emit light to pass through the light entering surface for traveling in the light guide, and the light reflecting surface of each of the light reflecting structures is configured to totally reflect a first part of the light, that travels in the light guide, to an external space through the main portion.

2. The optical module as claimed in claim 1, wherein the datum planes of the light reflecting structures have the same length in the longitudinal direction, the lengths of the connecting surfaces of the light reflecting structures in the longitudinal direction are gradually decreased in the direction from the light entering surface to the end surface, the first angle of each of the light reflecting structures is within a range of 50~85 degrees, and the second angle of each of the light reflecting structures is within a range of 5~45 degrees.

3. The optical module as claimed in claim 1, wherein in any two adjacent light reflecting structures, the first angle of one of the two adjacent light reflecting structures arranged adjacent to the light entering surface is smaller than or identical to that of the other light reflecting structure, and the second angle of one of the two adjacent light reflecting structures arranged adjacent to the light entering surface is smaller than or identical to that of the other light reflecting structure.

4. The optical module as claimed in claim 1, wherein at least one of the light reflecting surfaces is a flat surface.

5. The optical module as claimed in claim 1, wherein at least one of the light reflecting surfaces is a concave surface having a concaving depth less than or equal to 0.15 mm.

6. The optical module as claimed in claim 1, wherein at least one of the light reflecting surfaces is a convex surface having a protruding thickness less than or equal to 0.15 mm.

7. The optical module as claimed in claim 1, wherein the connecting surface of each of the light reflecting structures is configured to totally reflect a third part of the light, that travels in the light guide, to an external space through the main portion.

8. The optical module as claimed in claim 1, wherein the light reflecting surface of each of the light reflecting structures is configured to guide a second part of the light, that travels in the light guide, to the adjacent light transmitting surface through an external space.

9. A light guide, comprising:
   a main portion having an elongated shape defining a longitudinal direction, wherein the main portion has a light entering surface and an end surface respectively arranged on two opposite sides thereof in the longitudinal direction; and
   a light reflecting portion including a plurality of light reflecting structures arranged on the main portion, wherein the light reflecting structures are arranged in one row parallel to the longitudinal direction, and any two adjacent light reflecting structures are connected to each other, wherein each of the light reflecting structures defines a datum plane arranged adjacent to the main portion, and includes:
   a light transmitting surface connected to a portion of the datum plane arranged adjacent to the light entering surface, wherein the light transmitting surface and the datum plane have a first angle;
   a light reflecting surface connected to a portion of the datum plane arranged distant from the light entering surface, wherein the light reflecting surface and the datum plane have a second angle smaller than the first angle; and
   a connecting surface connected to the light transmitting surface and the light reflecting surface and arranged distant from the datum plane, wherein a distance between the connecting surface and the datum plane is defined as a thickness,
   wherein the thicknesses of the light reflecting structures are gradually increased in a direction from the light entering surface to the end surface.

10. The light guide as claimed in claim 9, wherein the datum planes of the light reflecting structures have the same length in the longitudinal direction, the lengths of the connecting surfaces of the light reflecting structures in the longitudinal direction are gradually decreased in the direction from the light entering surface to the end surface, the first angle of each of the light reflecting structures is within a range of 50~85 degrees, and the second angle of each of the light reflecting structures is within a range of 5~45 degrees.

* * * * *